Patented Oct. 2, 1945

2,386,066

UNITED STATES PATENT OFFICE 2,386,066

GLASS CLEANER

Raymond M. Schlabach, Canton, Ohio

No Drawing. Application October 29, 1943,
Serial No. 508,251

8 Claims. (Cl. 252—91)

The invention relates to a glass cleaner and more particularly to a treated, disposable paper which may be used, preferably dry, for cleaning glass of every description, as in windows, show cases, table tops, mirrors, automobile wind shields and lights, pictures, and the like; and which also may be used for cleaning and polishing metal surfaces such as silverware, chrome or chrome plated material and the like.

Many different kinds of polishing cloths have been proposed in the prior art, but they all involve a rather complicated chemical treatment of fabric, cloth, chamois, or the like, for preparing the polishing cloth. The resultant cloth is expensive, is difficult if not impossible to clean, and involves a substantial loss if thrown away when dirty.

Moreover, these chemically prepared prior art polishing cloths are not adapted for cleaning glass because they ordinarily will streak the glass. Some of the chemically prepared prior art cloths have been used for coating glass with a water repellent film to prevent clouding from rain or condensation; but such use may also result in streaking the glass.

Other prior art proposals have included treated paper for use as a polishing material but have been objectionable because they produce a dust in use, or may require water for use. Thus such products are actually not suitable for use in the places where their use would be most advantageous.

For instance, show cases in large department stores must be cleaned and polished frequently and if such cleaning and polishing involves the use of water or the production or dropping off of dust or dirt, the cases must be emptied in order to do the cleaning so as to avoid damage or injury to the goods contained therein. If the cases are emptied, there is no advantage in using a prepared cloth or treated paper of the prior art over using age-old wet washing, cleaning or polishing methods involving water and soap or Bon-Ami, or the like.

Likewise in the home, there is no advantage, over usual window washing methods, in using a prepared cloth or paper which must be used wet, or which dusts off; because either method involves a drying step or a step of cleaning up of the dust.

Accordingly, it is an object of the present invention to provide a glass cleaner made of inexpensive disposable paper that may be thrown away when it becomes dirty, without appreciable loss.

Moreover, it is an object of the present invention to provide a paper glass cleaner which will not streak glass when used for cleaning or polishing.

Also it is an object of the present invention to provide a paper glass cleaner which does not dust off when used for cleaning or polishing glass surfaces and the like.

Likewise, it is an object of the present invention to provide a paper glass cleaner which may be used dry for cleaning and polishing glass surfaces and the like.

In addition, it is an object of the present invention to provide a disposable paper cleaner which may be used for cleaning or polishing smoothly finished or polished surfaces of glass, metal or the like, without wetting and without streaking or dusting off.

It is also an object of the present invention to provide for the manufacture of a disposable paper cleaner incorporating the advantages and having the characteristics enumerated.

Likewise, it is an object of the present invention to provide a disposable paper cleaner for cleaning and polishing smoothly finished glass or metal surfaces which overcomes the difficulties and disadvantages of prior art materials.

And finally, it is an object of the present invention to provide a cheap and inexpensive paper cleaner which may be readily used and disposed of for cleaning and polishing glass or metal surfaces without disturbing, damaging, soiling or wetting articles or objects adjacent to the surface being cleaned or polished.

These and other objects and advantages may be obtained, and the prior art difficulties overcome, by the glass cleaner hereinafter described in detail and claimed, and by the method of making the improved glass cleaner hereinafter set forth in detail and claimed.

I have discovered that if porous, or unglazed or uncalendered paper, commonly called "kraft" paper, is treated with a mixture of powdered silica, glycerine and water in controlled proportions and dried, the resulting treated paper, preferably in the form of sheets, may be efficiently and satisfactorily used to clean and polish glass and metal surfaces and the like without dusting off and without wetting the treated paper.

Thus kraft paper, preferably in strip or web form, may be passed through a bath, preferably heated, of an aqueous solution of glycerine containing powdered silica in suspension, then between rolls and then through a hot air drier, to make the improved glass cleaner product.

The proportions and composition of the solution must be controlled, to achieve the objects of the present invention, to have the approximate proportions of 75 to 115 cc. of glycerine, and 150 grams of powdered silica per liter of water. The solution is preferably heated to 100° F. to 150° F. when passing the paper through the same; and the paper is preferably 15# to 20# kraft paper.

The powdered silica is preferably in extremely fine powder form, ground to 300 to 400 mesh; and the solution is constantly agitated as the paper web is passed through the same so as to maintain the powdered silica in uniform suspension in the solution and to prevent precipitation thereof to the bottom of the bath, thereby insuring uniform application of the solution to the paper.

The paper after drying is approximately 15% to 20% heavier; and this increase in weight to the extent indicated is accomplished by heating the solution. In other words, the hotter the solution, the heavier is the treated paper.

The proportions of glycerine and powdered silica are critical. The glycerine has several functions. First, it toughens the paper so that it may be severely abused, crumpled, and rubbed on the surface being cleaned without tearing, rupturing or wearing away, as compared with the same paper prior to treatment. Second, it makes the paper very soft and pliable so that it may be readily worked and manipulated in the hand in connection with a cleaning operation; in fact, the treated paper feels somewhat rubbery. Third, it carries the powdered silica onto and into the paper and acts as a binder to retain the powdered silica on the paper. Fourth, the glycerine prevents the silica from dusting off from the paper when used.

The powdered silica is the primary polishing and cleaning agent in the finished treated paper.

I have discovered that if the amount of glycerine is reduced materially below the lower limit of the stated proportions of 75 cc. to 150 grams of silica per liter of water, the silica is not properly bound or held to the paper and will dust off and the paper will not be sufficiently tough and pliable.

I have also discovered that if the amount of glycerine is increased materially above the upper limit of the stated portions of 115 cc. to 150 grams of silica per liter of water, the treated paper in use will streak glass or other surfaces being cleaned or polished, and may leave a film thereon which is difficult to remove.

A consideration of these factors leads to a possible explanation of the difficulties that have been encountered with the prior art products. All of the previously referred to known prior art products that utilize glycerine either streak glass or provide the glycerine to form a film for preventing the collection of fog or condensation on the glass.

On the other hand, in the present improved paper glass cleaner, the use of glycerine within the limits of the critical proportions stated, does not streak glass and does not form a film on the surface being cleaned or polished; but the glycerine performs the binding, toughening, softening and silica-retaining functions.

Likewise, in the prior art products that use silica, the silica dusts off so as to result in an accumulation of powdered silica at places adjacent to the surface being cleaned or polished, which accumulation must in turn be cleaned away.

Of course, an increase or decrease in the amount of silica in the solution will change the relative amounts of glycerine and silica in the treatment bath; and these relative amounts should not be varied outside the approximate limits stated in the above discussion of the critical relationship of the proportions of glycerine and silica in the solution.

The amount of water in the solution may be varied somewhat so long as the relationship between the proportions of glycerine and silica is maintained. An increase in the amount of water in the solution will result only in decreasing the net weight increase of the dried treated paper.

As stated, the paper is preferably 15 to 20 pound kraft paper, as this seems to be the most convenient weight of paper to manipulate in cleaning or polishing a glass or metal surface. As stated, the paper must be a porous, unglazed, or uncalendered paper, such as kraft paper, in order to readily impregnate it with the glycerine and silica.

The powdered silica should be as fine as possible, but it is unnecessary to have it powdered finer than being ground to 300 to 400 mesh, as silica of this degree of fineness does not scratch smooth or polished glass or metal surfaces when being used to clean or polish the same.

In passing the paper strip or web through the heated agitated solution, the porous, unglazed, kraft paper soaks up the solution and excess solution carried on the surface of the paper is removed by the passage of the paper between rolls. The following air drying operation, preferably performed in a hot air drier, evaporates the water from the other elements of the solution impregnated in and carried by the paper, but does not evaporate the glycerine.

After the paper has been treated and dried, it should be stored in a moisture-free atmosphere so as to prevent absorption of moisture by the glycerine in the paper; because such absorption of moisture may cause the treated paper to streak the article being cleaned.

For these reasons, the treated paper may be cut in sheets of convenient size, say 16" x 20", and a number of sheets enclosed and sealed in a tight package, such as a sealed Cellophane package, so that packages of the cleaner may be carried in stock on the shelves of a merchant without absorbing moisture.

Alternately, instead of treating kraft paper as received in rolls from a paper mill, the paper may be treated to incorporate the glycerine and powdered silica therein in the approximate proportions stated during the manufacture of paper at a paper mill.

The improved paper cleaner may be used to clean or polish any glass surfaces and the like and also to clean and polish metal surfaces such as silverware, either solid or plated, and polished plated trim or ornamentation metal, or other metal articles.

When used, a sheet of treated paper may be crumpled in the hand and wiper or rubbed over the surface to be cleaned, in the usual manner, or a layer of the paper may be pressed with the thumb or finger on the surface being cleaned and rubbed or wiped to and fro across the surface. The treated paper is and can be used dry. However, automobile windshields sometimes become heavily covered with the remains of bugs, and in this particular situation, the windshield may be cleaned more quickly by first wetting a paper and rubbing the windshield and then rubbing and cleaning the windshield with another dry crumpled ball of the treated paper.

Accordingly, the present invention provides a dry paper glass cleaner which can be used to clean and polish smooth or polished surfaces, such as metal and glass surfaces, without dusting off.

The finished dry paper glass cleaner product carries or is impregnated with glycerine and silica in the approximate amount of 15% to 20% by weight of the untreated paper and in the approximate ratio of from 2 to 3 to equal parts by weight of glycerine and silica. The approximate ratio of glycerine and silica carried by or impregnated in the paper as stated, results from the treatment of the paper in the solution described above folfollowed by drying.

Moreover, the agitation of the solution while treating the paper therewith, and the rolling of the treated paper as it leaves the treatment bath uniformly distributes the glycerine and silica and uniformly spreads and impregnates the same on and in the paper so as to form a non-dusting, non-streaking product when dried.

Having described the invention, and the improved glass cleaner product thereof, together with the improvements in manufacturing the glass cleaner product, the use of the same, the disadvantages overcome and the new results obtained; the new and useful products and methods, and reasonable mechanical equivalents thereof obvious to those skilled in the art, are set forth in the appended claims.

I claim:

1. The method of making a glass cleaner and the like, including the steps of treating kraft paper with an aqueous solution containing from 75 to 115 cc. glycerine and 150 gms. powdered silica per liter of water, and then drying the paper to evaporate the water and form a treated paper carrying glycerine and silica in the approximate amount of 15% to 20% by weight of untreated paper and in the approximate ratio of from 2 to 3 to equal parts by weight of glycerine and silica.

2. The method of making a glass cleaner and the like, including the steps of treating porous, unglazed, kraft paper in a hot aqueous solution containing from 75 to 115 cc. glycerine and 150 gms. powdered silica per liter of water, and then drying the paper to evaporate the water and form a treated paper carrying glycerine and silica in the approximate amount of 15% to 20% by weight of untreated paper and in the approximate ratio of from 2 to 3 to equal parts by weight of glycerine and silica.

3. The method of making a glass cleaner and the like, including the steps of treating kraft paper with a hot aqueous solution containing from 75 to 115 cc. glycerine and 150 gms. powdered silica per liter of water, then rolling the paper, and then drying the paper to evaporate the water and form a treated paper carrying glycerine and silica in the approximate amount of 15% to 20% by weight of untreated paper and in the approximate ratio of from 2 to 3 to equal parts by weight of glycerine and silica.

4. The method of making a glass cleaner and the like, including the steps of treating kraft paper with an aqueous solution containing 75 to 115 cc. glycerine and 150 gms. powdered silica per liter of water, and then hot air drying the paper to evaporate the water and form a treated paper carrying glycerine and silica in the approximate amount of 15% to 20% by weight of untreated paper and in the approximate ratio of from 2 to 3 to equal parts by weight of glycerine and silica.

5. The method of making a non-dusting, non-streaking paper glass cleaner impregnated with from 15% to 20% by weight of a mixture of glycerine and silica in the approximate ratio of from 2 to 3 to equal parts by weight, which includes the steps of treating kraft paper with an aqueous solution containing from 75 to 115 cc. glycerine and 150 gms. powdered silica per liter of water, agitating the solution while treating the paper therewith and rolling the treated paper to uniformly impregnate the paper with the glycerine and silica, and then drying the paper.

6. A non-dusting, non-streaking paper glass cleaner and the like consisting of a dry product formed of porous, unglazed kraft paper treated to increase its weight approximately 15% to 20% with glycerine and 300 to 400 mesh powdered silica in the approximate ratio of from 2 to 3 to equal parts by weight.

7. The method of making a glass cleaner and the like including the steps of treating porous, unglazed, kraft paper in a hot aqueous solution containing from 75 to 115 cc. glycerine and 150 gms. powdered silica per liter of water, agitating the solution while treating the paper therewith, then rolling the paper, and then hot air drying the paper to evaporate the water and form a treated paper carrying glycerine and silica in the approximate amount of 15% to 20% by weight of untreated paper and in the approximate ratio of from 2 to 3 to equal parts by weight of glycerine and silica.

8. The method of making a glass cleaner and the like including the steps of treating porous, unglazed 15 to 20 pound kraft paper in a hot aqueous solution containing from 75 to 115 cc. glycerine and 150 gms. of 300 to 400 mesh powdered silica per liter of water maintained at a temperature of from 100° to 150° F. agitating the solution while treating the paper therewith, then rolling the paper, and then hot air drying the paper to evaporate the water and form a treated paper carrying glycerine and silica in the approximate amount of 15% to 20% by weight of untreated paper and in the approximate ratio of from 2 to 3 to equal parts by weight of glycerine and silica.

RAYMOND M. SCHLABACH.